J. T. DOUGINE.
HYDRAULIC POWER PLANT.
APPLICATION FILED AUG. 2, 1909.
970,196.
Patented Sept. 13, 1910.
2 SHEETS—SHEET 1.
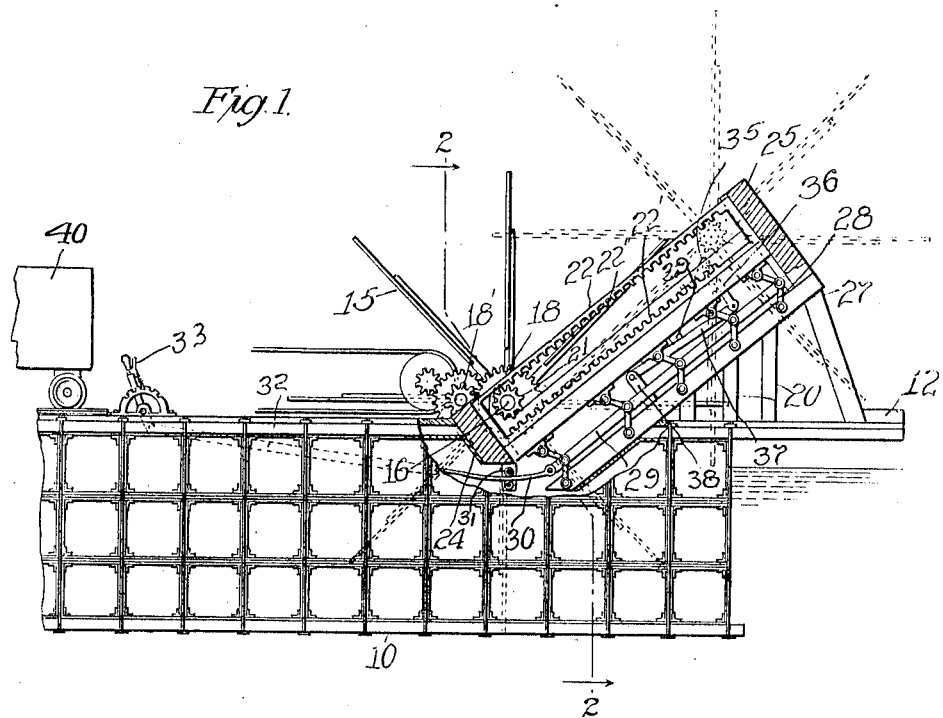
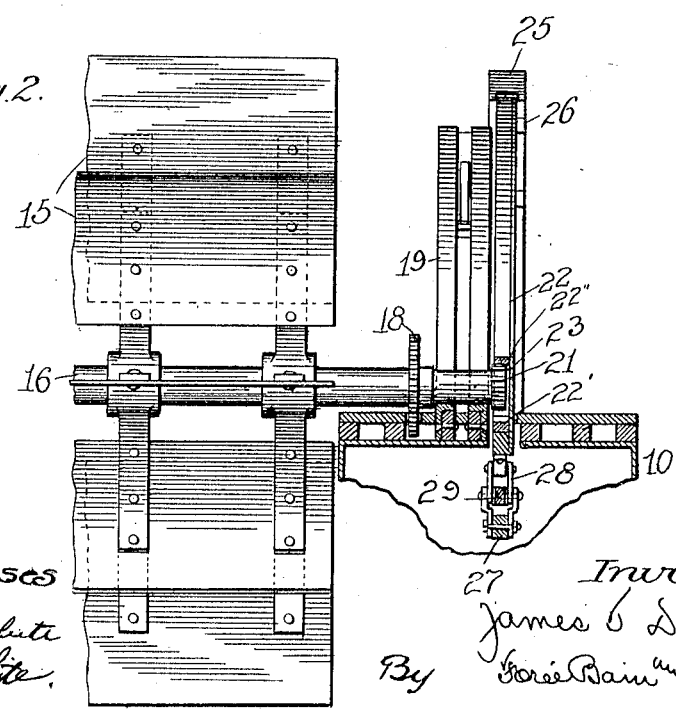

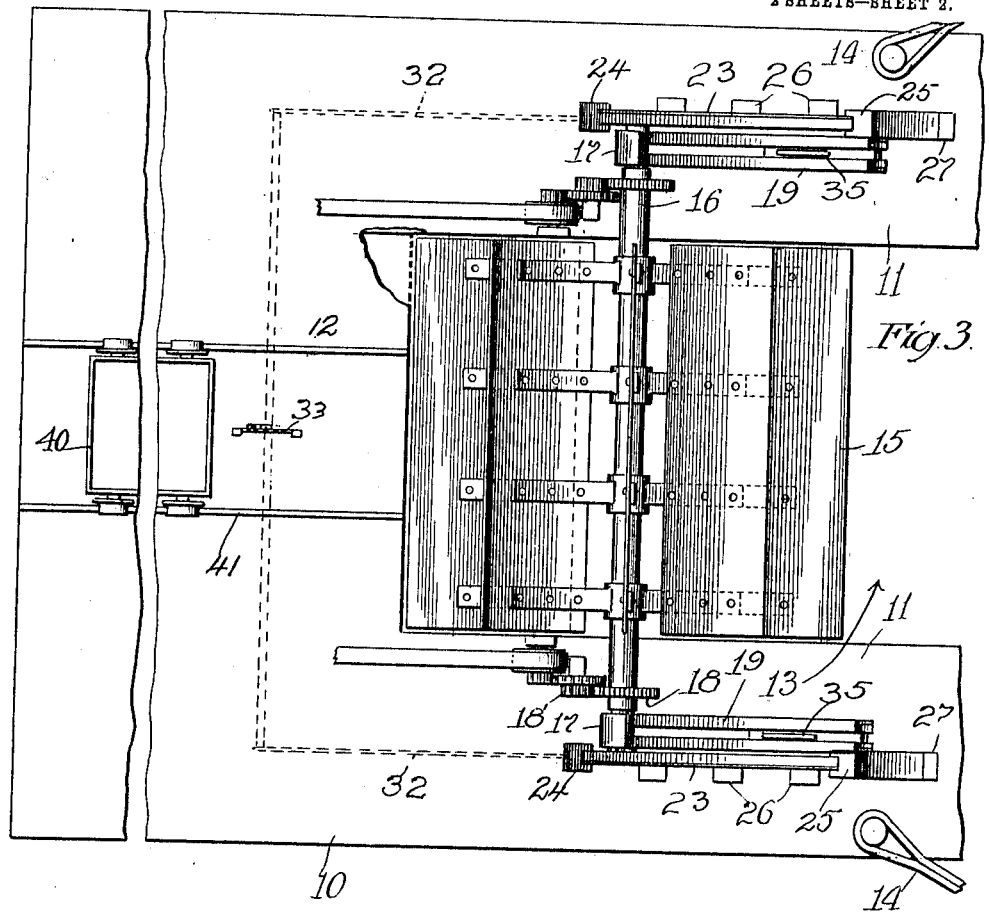
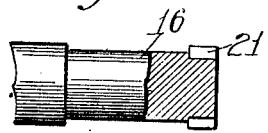
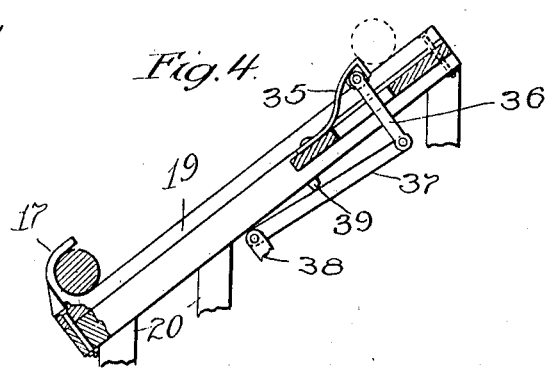

UNITED STATES PATENT OFFICE.

JAMES T. DOUGINE, OF KENOSHA, WISCONSIN.

HYDRAULIC-POWER PLANT.

970,196.  Specification of Letters Patent.  Patented Sept. 13, 1910.

Application filed August 2, 1909. Serial No. 510,810.

*To all whom it may concern:*

Be it known that I, JAMES T. DOUGINE, a citizen of the United States, residing at Kenosha, in the county of Kenosha and State of Wisconsin, have invented certain new and useful Improvements in Hydraulic-Power Plants, of which the following is a specification.

My invention relates to improvements in hydraulic power plants, and more particularly to plants wherein the prime mover is an undershot water wheel operating in a running stream. In operating such a plant, the water wheel or wheels, one or more of which may be provided abreast or in tandem in the stream, are of paddle-wheel construction, each dipping its lower segment in the water to receive rotary motion therefrom, the wheels receiving support either at the banks of the stream or, preferably, upon floating hulls or dams which may rise and fall with the stream and which are suitably positioned in the stream, as by shore lines or other anchorage. In the operation of such a plant it is of the utmost importance that each wheel shall be mounted easily to be raised and lowered into and out of the water, thereby to permit its operation to be stopped or started at will and the wheel to be removed from the water to permit the passage thereby of such floating logs and other dangerous objects as, passing such booms or other safe-guarding structures as may be placed above the plant in the stream, might endanger the safety of the wheels.

The primary object of my invention is to provide a water wheel equipment whereby the wheel may supply power to move itself into or out of operating position in the water.

Other and further objects of my invention will become apparent to those skilled in the art from the following description taken in conjunction with the accompanying drawings, in which—

Figure 1 is a side elevation, with parts broken away, of a hull or floating dam bearing a water wheel mounted in accordance with the preferred form of my invention; Fig. 2 is a section on line 2—2 of Fig. 1; Fig. 3 is a plan view; Fig. 4 is a detail of the track construction; and Fig. 5 is a gearing detail.

In the embodiment of my invention shown, I mount the water-wheel supporting framework upon the hull, 10, of what I may term catamaran construction, involving two parallel floats, 11, 11, partially decked over, as at 12, across the stern and bow above the water channel,—which extends centrally through the hull or float from end to end,—to leave clear or open a water-wheel well, 13, between the companion floats near the bow. Broadly considered, the hull may be of any suitable construction, although it is my preference to employ a cellular construction made up of a large number of cells suitably secured together and suitably arranged to be flooded to any desired degree to secure any desired submergence of the float.

14 indicates shore lines by which the hull is secured against movement in the stream.

The water wheel, 15, is of any suitable construction, preferably providing a plurality of blades peripherally free and supported upon spider arms, and is mounted on a shaft, 16, extending above the deck of the hull across the well, 13, to find support in bearings, 17, which are constructed as shown to afford rigid abutment for the shaft below and in rear thereof and are open in a forward direction, or constructed in any suitable fashion to be capable of releasing the shaft for rotary movement in a forward direction. Obviously, the water passing beneath the wheel rotates it, so that its top turns up-stream and the frictional effort of the shaft is to roll up-stream.

When the shaft 16 is in its bearing, a gear, 18, thereon, meshing with a pinion, 18', permanently located upon the hull, communicates power to said pinion for transference of power to any suitable mechanism to be driven, such as electric dynamos and the like, such construction being merely typical of a power-transmission structure wherein one part moves with the shaft and a coacting part is permanently located on the hull.

In conjunction with the water wheel, I supply suitable mechanism whereby the power of the wheel may be applied for the elevation of the wheel itself above its operative position. To this end I provide on opposite sides of the hull two operating structures, companion parts of which are identical, and but one of which I will describe. The open bearing 17 forms the bottom terminal of an inclined track, 19, tangentially opening thereto, upon which the shaft 16 may roll, said incline being suitably supported upon any frame work, 20, preferably at an angle of about 30° to the horizontal, and ascending toward the bow of the hull. On the end of the shaft 16 I provide a small pinion 21, which may be integral with or otherwise secured to the shaft and which has a pitch line of identical radius with the bearing surface of said shaft, as best shown in Fig. 5. The pinion 21 stands in a vertical plane beyond the track 19 and has coöperating therewith a movable rack structure, 22, providing a bottom rack, 22', and an upper rack, 22'', in confronting relation, secured upon a rigid back plate, 23, which stands outside of the end of the shaft. The upper rack is preferably stripped or mutilated adjacent its lower extremity, so that when the shaft is at its lowest range of movement in operating position, the upper rack cannot engage the same, while the opposite or upper extremity of the lower rack is stripped to free the pinion when the shaft is at the upper extremity of its range of movement. The rack structure 22 as a whole is arranged for sufficient transverse displacement on its plane, that is to say edge-wise displacement at right angles to its longitudinal axis, to permit either rack to be thrown into or out of position for coöperation with the pinion, and to this end the rack structure 22 is slidingly mounted at its ends in thrust blocks or pillows, 24 and 25, and may further have its back plate guided by exterior framing, 26. For producing the desired transverse movement of the rack, any suitable means may be provided, that which I prefer comprising a rigid base, 27, a plurality of toggle levers, 28, bearing on the base and supporting the rack structure 22, and a central bar, 29, connecting the elbows of the toggles and having communication through a strap, 30, passing between guiding rollers, 31, with a link mechanism, 32, arranged for operation by the latched lever, 33, so that when said lever is thrown forward and the toggle members straightened to their greatest extent, the lower rack 22' will be thrown up into operative relation to the pinion 21; or conversely, when the lever is thrown backward and the toggle joints are broken to their maximum extent, the upper rack is drawn down into operative relation with respect to the pinion 21. It will be understood that the handle 33 may be common to the two moving systems, so that they operate simultaneously and equally at all times.

Now, it will be apparent that, assuming the wheel to be in its normal position in coöperation with its transmission mechanism 18', if it is desired to elevate the wheel, the lever 33 is operated to straighten the toggles, 28, thereby forcing the lower rack upward into operative relation to the pinion 21 upon the end of the shaft, which, engaging the rack, exerts a thrust thereon against the pillow 24, and the rotary movement imparted to the wheel by the water, causes the wheel of its own motion to roll up the incline in virtue of its gearing engagement with the rack, the weight of the wheel being carried upon the inclined track 19, and the thrust alone being carried by the rack 22'. When the wheel reaches the top of its incline, with its blade tips at or near the surface of the water, it may be retained in inoperative or disabled position in any desired manner, but for its automatic maintenance, I may provide a shaft latch, 35, of common spring construction, arranged to be depressed by the shaft as the latter rolls up its incline, and to spring up in rear of the shaft to prevent return of the shaft to the bottom of its incline until intentionally released. For the release of such latch, any means may be provided, that which I have illustrated comprising a link, 36, connected at one end to the latch 35 and at the other to a lever, 37, pivoted upon a bracket, 38, upon the rack support, 27, to be borne upon adjacent its center by a projection, 39, extending horizontally from the rack to a point above and in position to bear against lever 37, so that when the rack moves downward, the multiplying effect of lever 37 causes the spring also to move downward, thereby to release the shaft. Obviously, to restore the shaft to its operating position, the toggles are thrown to bent position, thereby disengaging the lower rack 22' from pinion 21 and bringing the upper rack into engagement with said pinion 21, so that rotary movement imparted to the water wheel by the water will cause the wheel to roll down the incline, in virtue of the direction of movement necessarily imparted thereto by coöperation of the rack and pinion, its downward motion being opposed, however, by its frictional grip upon the rails of the track, so that the descent of the wheel does not occur at an unduly high speed.

It will be observed that as the wheel rides up to the top of its incline, the gearing element 18 of its transmission leaves the stationary element 18', thereby disconnecting the water wheel from the power mechanism to be driven, such as the dynamo and the like, and leaving it free to exert all of its power on its own elevation. Upon the return of the wheel to normal position, its pinion 18 automatically reëngages the fixed pinion 18', and driving connection with the power translating devices is again established. It will be observed, further, that as the wheel rides up its incline it approaches the bow of the boat, raises its center of gravity, and loses the buoyant effect of the water, so that it has a tendency to cause the bow of the hull to dip. This is advantageous in that it enables the wheel to maintain sufficient connection with the water to drive itself clear up to its uppermost position with ease, but to compensate for the displacement of the weight of the water wheel, I provide upon the hull a shiftable counterpoise, 40, preferably in the form of a car mounted to run upon track 41 upon the hull and susceptible of being loaded to any degree to constitute a variable and shiftable counterpoise. Thus when the wheel has reached its elevated position and is automatically latched therein, the counterpoise may be run out to a stern position, such that it elevates the hull back to or above normal position and lifts the water wheel clear of the water-surface.

It will be understood that the specific illustration herein given is intended only for purposes of a full disclosure and without intent to limit my invention in its broader aspects to the particular devices shown, and that wide variation in the application of the invention might be made without departure from its spirit and scope and within the scope of the appended claims.

What I claim is:

1. The combination with a water wheel and shaft, of an inclined elevating track therefor, a shaft-bearing arranged to open to said track, a pinion upon said shaft, a rack paralleling the track, and means for throwing said rack into or out of operative association with the pinion upon the shaft.

2. The combination with a water wheel and shaft, of an elevating track for the shaft; a bearing arranged to open to said track, a pinion upon the shaft, having a pitch line of substantially the same radius as the portion of the shaft bearing on the track; a rack element paralleling said track, having upper and lower racks adapted for alternative engagement with opposite sides of the pinion; and means for shifting said rack members to bring either rack into operative relation to the pinion.

3. The combination of a hull providing separated floats and an intermediate passage, a water wheel in said passage, a shaft therefor, inclined tracks for the opposite ends of the said shaft, bearings for said shaft ends communicating with said tracks, pinions upon the shaft ends, rack members disposed for coöperation with the said pinions to cause the wheel in its rotation to elevate or lower itself upon the inclined tracks, and means for simultaneously shifting the rack members associated with the opposite pinions to cause either up or down movement of the shaft.

4. The combination of a hull, a water wheel mounted upon said hull, an inclined track, a water-wheel shaft adapted to roll upon the track, means for applying the rotation of the water wheel to cause it to elevate or lower itself upon said inclined track, and a longitudinally shiftable counterpoise upon said hull.

5. The combination of a hull, a water wheel mounted upon said hull, an inclined track, a water wheel shaft adapted and arranged to roll upon said track, and means for applying the rotation of the water wheel to cause it to elevate or lower itself upon said inclined track.

In testimony whereof I hereunto set my hand in the presence of two witnesses.

JAMES T. DOUGINE.

In the presence of—
W. LINN ALLEN,
MARY F. ALLEN.